United States Patent

Baumann

[11] 4,018,245
[45] Apr. 19, 1977

[54] PERFORATED VALVE TRIM AND METHOD FOR PRODUCING THE SAME

[76] Inventor: Hans D. Baumann, P.O. Box 471, Rye, N.H. 03870

[22] Filed: Nov. 12, 1975

[21] Appl. No.: 631,203

[52] U.S. Cl. .............................. 137/270; 137/625.3; 137/625.38; 138/42

[51] Int. Cl.² ......................................... F16K 47/02

[58] Field of Search ..... 137/625.3, 625.37, 625.38; 138/43, 42, 46

[56] References Cited

UNITED STATES PATENTS

| 977,427 | 12/1910 | Armstrong | 138/43 |
|---|---|---|---|
| 1,481,792 | 1/1924 | Dailey | 138/43 X |
| 1,915,867 | 6/1933 | Penick | 138/42 |
| 2,118,290 | 5/1938 | Black | 138/42 |
| 2,118,295 | 5/1938 | Crawford et al. | 138/42 |
| 2,229,441 | 1/1941 | Carlson | 138/42 X |
| 3,513,864 | 5/1970 | Self | 137/625.3 X |
| 3,780,767 | 12/1973 | Borg et al. | 137/625.3 |
| 3,856,049 | 12/1974 | Scull | 251/127 X |

*Primary Examiner*—Arnold Rosenthal

[57] ABSTRACT

A valve plug or valve seat combination having a large number of small fluid conducting passages in a multitude of horizontal planes and comprised of a stack of identical stampings having alternate sectional patterns consisting of a trapezoidenal vertical opening in some and slotted radial opening in other sections and which, when circularly displaced to one another, form internal vertical fluid conducting passages together with said horizontal fluid passages, both vertical and horizontal passages being interconnected.

4 Claims, 4 Drawing Figures

PERFORATED VALVE TRIM AND METHOD FOR PRODUCING THE SAME

BACKGROUND OF THE INVENTION

This invention relates to throttling devices or valve trim as part of conventional control valves where dissipation of moderate pressure differentials are desired, especially with natural gas or steam as fluid to be handled by the valve.

Concern for environmental noise control tends to exclude conventional valves with their solid plugs and seatring combinations due to their high inherent aerodynamic noise levels whenever the ratio between inlet and outlet pressure across the valve exceeds 2:1, i.e. sonic throttling velocity exists. While the best method for noise reduction is a combination of multiple throttling stages in series (to reduce velocity) and a large number of throttling passages as, for example, described in my U.S. Pat. No. 3,908,698, there are many more moderate applications i.e. lower pressure differentials, where it is sufficient to increase the number of parallel throttling passages in order to obtain the desired noise reduction, usually in the order of 10 to 15 dB.

Accoustical energy, i.e. Soundpower, increases roughly as the 18th power of the flow area of a valve orifice but only to the 10th power of increase in mass flow. It is therefore easy to see that important noise savings can be made simply by keeping the orifice diameter constant and by accommodating the increase in mass flow through increase in the number of parallel orifices. For example, about 14 dB can be saved with a 64-fold increase in mass flow then, instead of employing a single orifice 8 times enlarged in diameter, 64 individual orifices of the same original diameter are used.

While the concept of multiple orifice trim is not new, the production of conventional state of the art devices is rather costly as it involves mechanically drilling a multitude of small holes into heavy sections of stainless steel plugs or cage members. The machining problems are aggravated by the fact that the surfaces to be drilled are curved, prohibiting the employment of multiple spindle drill heads.

My invention overcomes these difficulties by employing a stack of identical stampings which, when arranged in a certain circularly off-set pattern, automatically create an intricate network of vertical flow passages leading and feeding fluid to be controlled to a large number of individual small horizontal throttling passages from which fluid is allowed to expand into the downstream valve cavity.

After suitable arrangement of the plates against each other, the stack is either mechanically fastened or simply brazed together and against a solid valve plug disk or, in the female version against a solid seatring of conventional shape.

One other advantage of my invention lies in the fact, that each of the formed vertical flow passages can be considered as a separate pressurized cavity and, being substantially smaller than the single large cavity of a hollowed-out valve plug of conventional construction, will require less pressure carrying wall thickness than the latter, leading to weight savings and increased flow capacity in the vertical axis.

Additional great rigidity is derived from the honeycomb type network of ribs and circular wall sections, which overlap and, when brazed together, form a rigid structure.

These and other objects, features, and advantages of the present invention will be understood from the following detailed description.

DESCRIPTION OF THE PREFERRED EMBODIMENT

Figure 1:
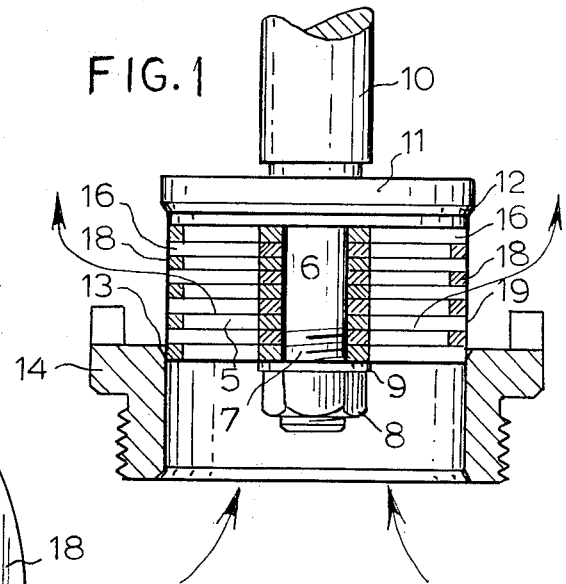
FIG. 1 is a vertical section of a valve plug incorporating a male embodiment of my invention.

A typical embodiment of my invention in form of a valve plug cooperating with a conventional valve orifice or seatring is shown in FIG. 1, Here, the valve plug consists of a stack of plates 5 being held together by a valve stem 6 lower portion 7 of which is threaded to receive a nut 8 and a washer 9. The upper portion of valve plug 10 has a solid circular disk 11 whose outer diameter extends in radial direction above the external diameter of plates 5 to form a stop shoulder and seating chamfer 12 which, when in the lowest stroke position, engages a similar chamfer 13 of a conventional valve seatring 14 to provide tight valve closure.

Figure 2:
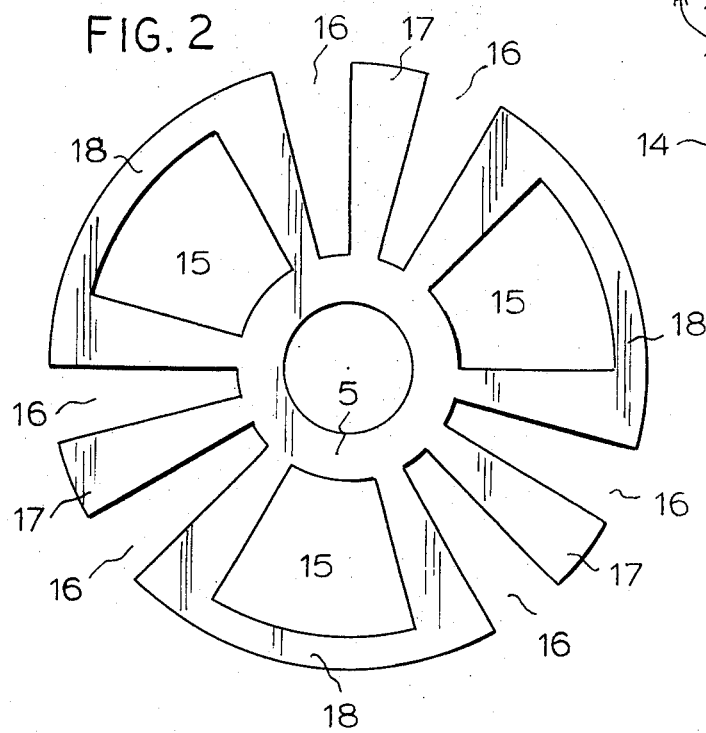
FIG. 2 is a larger scale plane view of a single plate forming part of the embodiment illustrated in FIG. 1.

All of plates 5 are of identical shape and more closely illustrated in FIG. 2. They consist of alternately shaped circular segments spaced apart in equal angular distances. The first pattern consists of a nearly trapezoidal opening 15, while the alternate section features two narrow slotted openings 16 penetrating the plate from the outer periphery and extending nearly throughout the whole radial width of each plate, leaving between them a male tongue 17.

Note, that in this preferred embodiment all tongues 17 are spaced 120° apart and so are openings 15.

When assembled, as shown in FIG. 1, plates 5 are alternately rotated 60° so that the center of tongues 17 straddle the center of openings 15 with the outer rim 18 of plates 5 forming a support platform for tongue 17 and at the same time providing a separation between pairs of slotted openings 16.

It is now apparent, that openings 15 and the portion of slots 16 not covered by rim 18 form fluid conducting cavities in vertical direction, i.e. in the direction of the longitudinal plug axis, while at the same time, the external periphery of slots 16 provide (in conjunction with the supporting plane surfaces of rim 18) individual rectangular flow passages 19 in horizontal direction.

Figure 3:
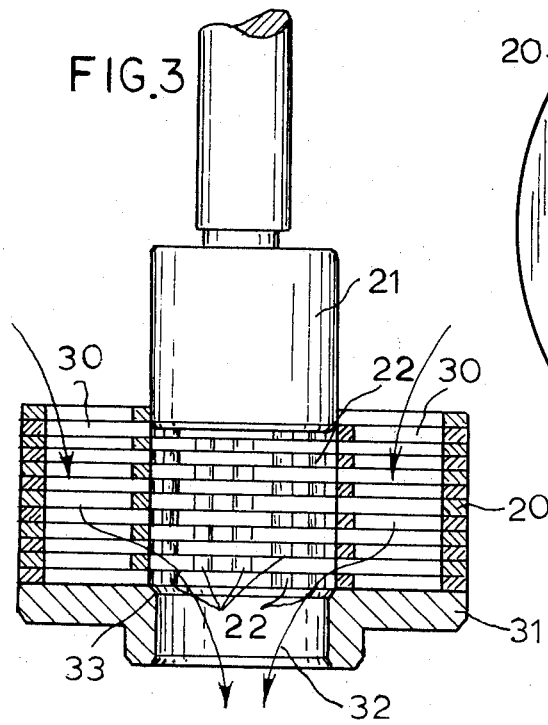
FIG. 3 is a vertical section of a valve set incorporating a female embodiment of my invention.
Figure 4:
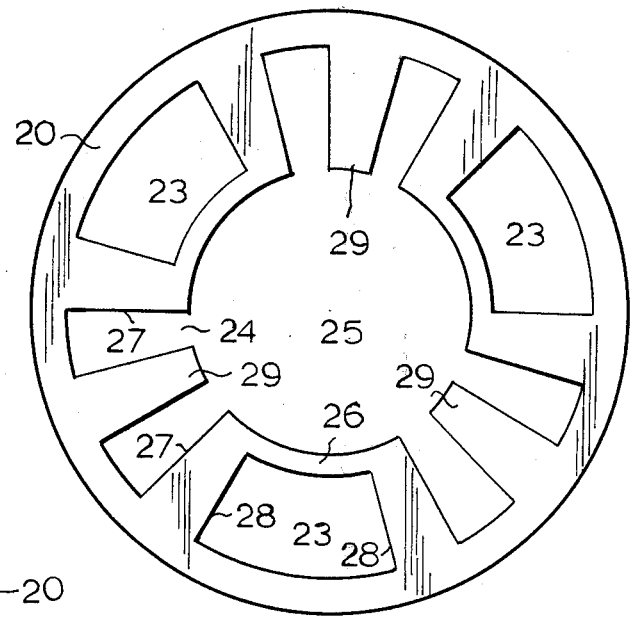
FIG. 4 is a larger scale plane view of a single plate forming part of the embodiment illustrated in FIG. 3.

An alternate embodiment of my invention is shown in FIG. 3. Here a stack of plates 20 form perforated flow passages for a female version of my invention, i.e. in form of a seatring cooperating with a conventional cylindrical valve plug 21 to control the flow of fluid depending on the amount of exposure by the reciprocating plug 21 of rectangular flow passages 22 formed by the overlapping, in a rotating pattern, of alternate layers of plates 20.

Similar to plates 5, each of plates 20 is sub-divided into equally spaced circular sections. Some of which have trapezoidal openings 23, while others contain slots 24 penetrating radially outward from an inner bore 25. The outer radial walls 27 of slots 24 align with the inner radial walls 28 of opening 23, whenever a pair of plates 20 is circularly off-set by 60° rotation to each other while inner wall means 26 form support for tongues 29 and provide separation of slots 24 from adjacent plates.

Openings 24 together with the upper and lower plane surfaces of wall means 26 form individual rectangular horizontal flow passages 22 while openings 23 and part of slots 24 provide access of fluid in the vertical direction. The stroke of plug 21 is preferrably limited at a position, where the total area of all circumferential rectangular passages 22 is identical to the total area of all vertical passages 30.

The correctly arranged stack of plates 20 is brazed together with a lower disk 31. The latter, incorporating a reduced bore 32, provides a stop shoulder and seating chamfer 33 for valve plug 21.

While the invention has been illustrated in a preferred arrangement, numerous changes can be made without departing from the scope of the attached claims. It is therefore possible to have two separate pairs of plates in which the first contains equally spaced slots only, while the second would incorporate the named trapezoidal openings. Furthermore, my invention is not limited in the number of openings per plate or the particular shape of individual openings.

Having thus described my invention, I claim as being new:

1. Perforated valve trim for the control of fluid flow as part of and between a cylindrical valve plug slidingly engaged in a cylindrical valve orifice comprising:

a vertical stack of horizontal plates, each plate being subdivided into first and second wedge shaped segments, at least one first segment per plate having one or more slotted openings extending in radial fashion throughout a portion of the radial width of said plates, thereby providing access of fluid in the radial direction, at least one second segment per plate having at least one large, vertical flow passage opening therethrough, providing a communicating passage for fluid in the vertical direction; said large vertical opening having a cross-sectional area exceeding the combined cross-sectional areas of the slotted openings of said at least one first segment, all stack plates being angularly displaced with respect to each other about the vertical stack axis, so that in successive stack plates the large opening overlaps the segments encompassing the slotted openings;

whereby are provided a number of separate fluid passages extending through said stack in vertical direction providing access for and communicating with restrictive fluid passages formed by the width of each of said slotted openings and the height of each plate in the horizontal direction.

2. Perforated valve trim as defined in claim 1, wherein the height of each plate is less than one half the width of each of said slotted openings.

3. Perforated valve trim as defined in claim 1, wherein said plates comprise rings.

4. Perforated valve trim as defined in claim 1, wherein said plates of said stack identically have around their circumference repeating patterns of equal, alternating, first and second segments.

* * * * *